United States Patent [19]
Fujiwara

[11] Patent Number: 5,790,657
[45] Date of Patent: Aug. 4, 1998

[54] ECHO SUPPRESSOR CAPABLE OF SUPPRESSING AN ECHO RESULTING FROM ACOUSTIC COUPLING WITHOUT SPOILING A NATURAL SOUND OF CONVERSATION

[75] Inventor: Ryuhei Fujiwara, Tokyo, Japan

[73] Assignee: NEC Corporation, Tokyo, Japan

[21] Appl. No.: 592,461

[22] Filed: Jan. 26, 1996

[30] Foreign Application Priority Data

Jan. 26, 1995 [JP] Japan ................................ 7-010961

[51] Int. Cl.⁶ ........................................... H04M 9/00
[52] U.S. Cl. ...................... 379/406; 379/390; 379/409; 379/410; 704/233
[58] Field of Search ...................... 379/406, 388, 379/389, 390, 409, 410, 420; 387/71.1; 704/233

[56] References Cited

U.S. PATENT DOCUMENTS

| | | | |
|---|---|---|---|
| 3,275,759 | 9/1966 | Brady | 370/32.1 |
| 3,906,172 | 9/1975 | Hoeschele, Jr. et al. | 370/32.1 |
| 4,979,163 | 12/1990 | Erving et al. | 370/32.1 |
| 5,016,271 | 5/1991 | Ford | 379/410 |
| 5,283,784 | 2/1994 | Genter | 379/410 |
| 5,343,521 | 8/1994 | Jullien et al. | 379/410 |
| 5,371,789 | 12/1994 | Hirano | 379/410 |
| 5,471,528 | 11/1995 | Reesor | 379/389 |
| 5,477,534 | 12/1995 | Kusano | 379/410 |
| 5,515,432 | 5/1996 | Rasmusson | 379/389 |
| 5,544,242 | 8/1996 | Robinson | 379/406 |
| 5,555,300 | 9/1996 | Gutzmer | 379/406 |
| 5,608,793 | 3/1997 | Uriya | 379/406 |
| 5,617,472 | 4/1997 | Yoshida et al. | 379/389 |
| 5,631,967 | 5/1997 | Wagner et al. | 379/406 |
| 5,644,635 | 7/1997 | Armbruster | 379/406 |

FOREIGN PATENT DOCUMENTS

| | | |
|---|---|---|
| 61-348 | 4/1984 | Japan . |
| 62-290251 | 12/1987 | Japan . |
| 1-19455 | 8/1989 | Japan . |
| 1-261059 | 10/1989 | Japan . |
| 1-319353 | 12/1989 | Japan . |

Primary Examiner—Krista Zele
Assistant Examiner—Jacques M. Saint-Surin
Attorney, Agent, or Firm—Sughrue, Mion, Zinn, Macpeak & Seas, PLLC

[57] ABSTRACT

In an echo suppressor for suppressing an echo resulting from acoustic coupling in a telephone apparatus, an attenuator attenuates a transmission signal level with reference to a first level signal representative of a level of a reception speech signal which is supplied to the telephone apparatus. Supplied with the reception speech signal through an input terminal, the first detecting arrangement detects the reception speech signal to produce the first level signal. It is a matter of course that a receiver converts the reception speech signal into a reception speech sound. A microphone produces a transmission speech signal in response to a transmission speech sound.

15 Claims, 2 Drawing Sheets

ECHO SUPPRESSOR CAPABLE OF SUPPRESSING AN ECHO RESULTING FROM ACOUSTIC COUPLING WITHOUT SPOILING A NATURAL SOUND OF CONVERSATION

BACKGROUND OF THE INVENTION

This invention relates to an echo suppressor for suppressing an echo and, in particular, to an echo suppressor for use in a telephone apparatus included in a digital radio telephone system. Furthermore, the present invention relates to the telephone apparatus and a method of suppressing the echo.

In order to meet the approaching multimedia era, recent radio telephone systems use a digital system in which a digital modulation signal is transmitted and received through a radio transmission path. In such a digital radio telephone system, each of telephone apparatuses communicating with one another comprises a speech coder/decoder (CODEC).

Generally, the radio transmission path is allocated with an occupied bandwidth as narrow as possible in order to fully effectively utilize radio resources. In addition, the digital radio telephone system may include a telephone apparatus, such as a portable digital radio telephone apparatus, which is used in an unstable radio environment. In this case, in order to maintain a sufficient channel quality, the digital modulation signal is transmitted and received with an error correction code added to an information bit. Under the above-mentioned circumstances, the radio transmission path inevitably has a low data transmission speed. Therefore, the speech coder/decoder is required to compress a speech signal at an extremely high compression ratio.

In a conventional analog radio telephone system, a radio wave is directly modulated with a speech sound kept in the form of an analog signal. The analog signal received and demodulated is directly amplified and reproduced by a receiver as a reproduced speech sound. In the analog radio telephone system, a delay in a transmission path is not so great as compared with a wire telephone system. A radio telephone apparatus in the analog radio telephone system suffers mechanical acoustic coupling between a receiver and a microphone. Such mechanical acoustic coupling results in occurrence of an echo. However, the resultant echo is not so strong to be a serious problem, as compared with an electrical echo, for example, in two-wire/four-wire conversion in a wire telephone apparatus of the wire telephone system.

In the meanwhile, it is known that a human being is more sensitive to the echo when the echo returns later. In the above-mentioned digital radio telephone system using the speech coder/decoder for carrying out compression at a high compression ratio, the speech coder/decoder requires a long time to carry out encoding and decoding operations because the processing is complicated. As a result, a transmission delay in a channel is increased. Under the circumstances, an echo sound resulting from acoustic coupling is so strongly felt to interfere communication between the telephone apparatuses in the digital radio telephone system. As described above, such echo sound is not a serious problem in the analog radio telephone system of a less transmission delay.

In order to suppress the echo in the digital radio telephone system, it is proposed to use an echo canceller. Japanese Unexamined Patent Publication No. 319353/1989 (Japanese Patent Application No. 152772 of 1963 filed on Jun. 20, 1988 by Yoshihiro Yamamura et al) discloses an echo canceller which serves to prevent occurrence of howling in a telephone conference system. Japanese Unexamined Patent Publication No. 290251/1987 (Japanese Patent Application No. 134442 of 1986 filed on Jun. 10, 1986 by Yasuhiro Tomioka et al) discloses an echo canceller which serves to prevent occurrence of a side tone corresponding to the echo and of howling. This echo canceller is for producing a cancelling current having a phase reverse to that of a speech transmit-receive current to superpose the cancelling current on the speech transmit-receive current. Japanese Unexamined Patent Publication No. 261059/1989 (Japanese Patent Application No. 89391 of 1988 filed on Apr. 12, 1988 by Takayuki Minegishi alone) discloses an echo canceller for superposing a reverse component of a reception speech signal on a transmission speech signal to thereby prevent occurrence of an echo.

However, even if any one of the above-mentioned echo cancellers is used in the telephone apparatus of the digital radio telephone system, it is difficult to sufficiently suppress the echo. Specifically, acoustic coupling within a casing of the telephone apparatus is on the order of −20 dB. Accordingly, a speech level of the echo sound supplied from the receiver to the microphone is difficult to distinguish from a surrounding noise level. This results in inaccurate calculation of an echo path. Thus, an expected effect is not achieved.

Another proposal is made of the use of a voice switch. However, a conventional voice switch of a gain control type spoils a natural sound of conversation. Japanese Unexamined Patent Publication No. 61348/1984 (Japanese Patent Application No. 172321 of 1982 filed on Sep. 30, 1982 by Yasuharu Sato alone) discloses a linear attenuator used as a transmitter attenuator. The linear attenuator has an attenuation factor which is determined in reverse proportion to a volume of a reception speech signal. Japanese Unexamined Patent Publication No. 194555/1989 (corresponding to U.S. patent application Ser. No. 131,610 filed on Dec. 11, 1987) discloses an expander which serves to minimize a background noise. The background noise is a noise caught by a microphone in absence of a strong reception speech signal. The expander is for decreasing a gain of a transmitter amplifier in proportion to the background noise detected by a noise detector. In this case, the gain of the transmitter amplifier is controlled by the background noise detected by the noise detector.

SUMMARY OF THE INVENTION

It is therefore an object of this invention to provide an echo suppressor which is capable of suppressing an echo sound resulting from acoustic coupling without spoiling a natural sound of conversation.

It is another object of this invention to provide a telephone apparatus including the echo suppressor.

It is still another object of this invention to provide a method of suppressing an echo resulting from the acoustic coupling.

Other objects of this invention will become clear as the description proceeds.

An echo suppressor to which this invention is applicable is for use in combination with a telephone apparatus comprising an input terminal supplied with a reception speech signal, electroacoustic converting means for converting the reception speech signal into a reception speech sound, and acoustoelectric converting means responsive to a transmission speech sound for producing a transmission speech signal. The echo suppressor is for suppressing an echo resulting from acoustic coupling between the electroacoustic converting means and the acoustoelectric converting means.

The reception speech signal has a reception signal level. The transmission speech signal has a transmission signal level.

According to this invention, the echo suppressor comprises first detecting means connected to the input terminal for detecting the reception speech signal to produce a first level signal representative of the reception signal level, second detecting means connected to the acoustoelectric converting means for detecting the transmission speech signal to produce a second level signal representative of the transmission signal level, and attenuating means connected to the acoustoelectric converting means and to the first and the second detecting means for attenuating the transmission signal level with reference to the first and the second level signals.

According to this invention, there is provided a telephone apparatus comprising an input terminal supplied with a reception speech signal having a reception signal level, electroacoustic converting means connected to the input terminal for converting the reception speech signal into a reception speech sound, acoustoelectric converting means responsive to a transmission speech sound for producing a transmission speech signal having a transmission signal level, and an echo suppressor connected to the input terminal and the acoustoelectric converting means for suppressing an echo resulting from acoustic coupling between the electroacoustic converting means and the acoustoelectric converting means. In the telephone apparatus, the echo suppressor comprises first detecting means connected to the input terminal for detecting the reception speech signal to produce a first level signal representative of the reception signal level, second detecting means connected to the acoustoelectric converting means for detecting the transmission speech signal to produce a second level signal representative of the transmission signal level, and attenuating means connected to the acoustoelectric converting means and to the first and the second detecting means for attenuating the transmission signal level with reference to the first and the second level signals.

According to this invention, there is provided a method of suppressing an echo in combination with a telephone apparatus comprising an input terminal supplies with a reception speech signal, electroacoustic converting means for converting the reception speech signal into a reception speech sound, and acoustoelectric converting means responsive to a transmission speech sound for producing a transmission speech signal. The an echo results from acoustic coupling between the electroacoustic converting means and the acoustoelectric converting means. The reception speech signal has a reception signal level. The transmission speech signal has a transmission signal level. The method comprises the steps of detecting the reception speech signal to produce a first level signal representative of the reception signal level, detecting the transmission speech signal to produce a second level signal representative of the transmission signal level, and attenuating the transmission signal level with reference to the first and the second level signals.

DESCRIPTION OF THE PREFERRED EMBODIMENT

Figure 1:
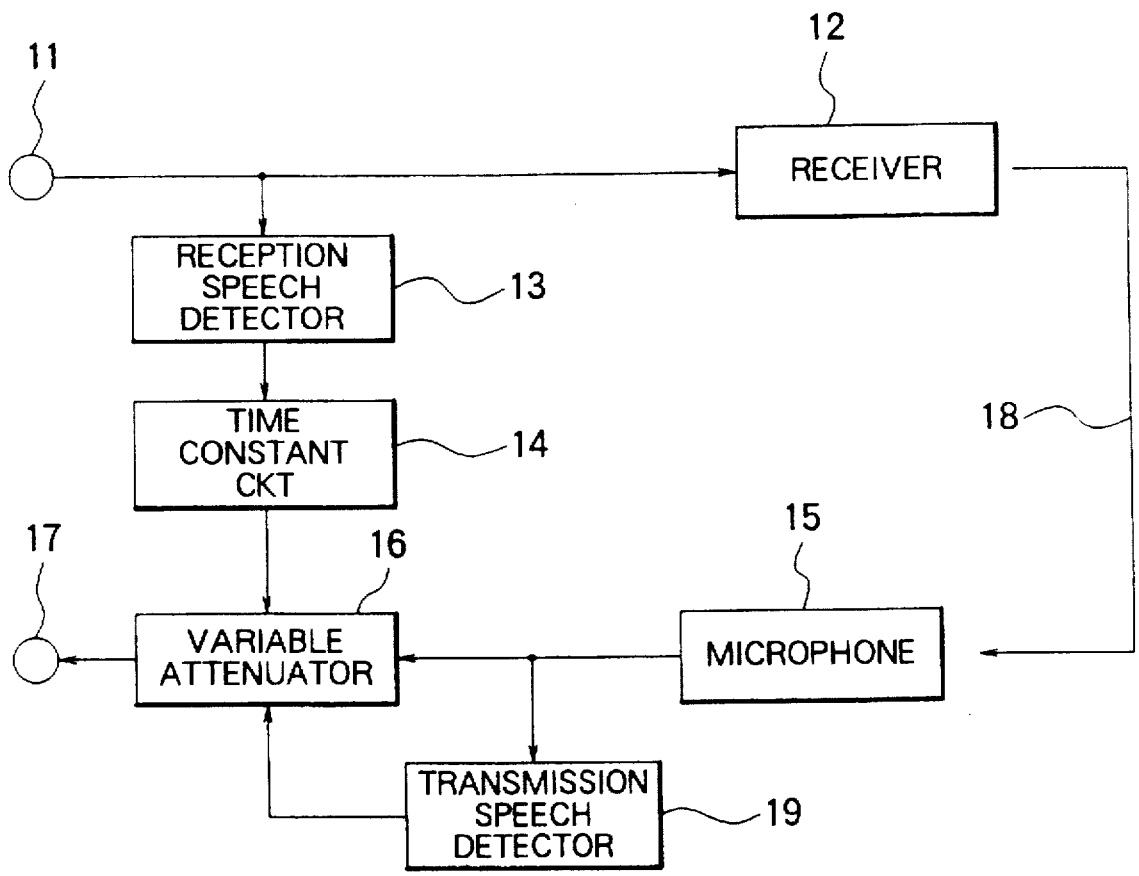
FIG. 1 is a block diagram of a telephone apparatus including an echo suppressor according to an embodiment of this invention.

Now, description will be made as regards this invention with reference to the drawing.

Referring to FIG. 1, description will be made as regards a telephone apparatus including an echo suppressor according to an embodiment of this invention. The telephone apparatus comprises a receiver or an electroacoustic converter 12 for converting a reception speech signal supplied through an input terminal 11 into a reception speech sound, and a microphone or an acoustoelectric converter 15 responsive to a transmission speech sound for producing a transmission speech signal. The reception speech signal has a reception signal level. The transmission speech signal has a transmission signal level.

In the manner which will later be described in detail, the echo suppressor serves to suppress an echo resulting from acoustic coupling between the receiver 12 and the microphone 15. The acoustic coupling is a phenomenon that the reception speech sound is supplied to the microphone 15 through an acoustic signal echo path 18 in the manner known in the art.

The telephone apparatus may be of any type used in a digital radio telephone system. However, the echo suppressor is more effective when it is applied to a telephone apparatus comprising a speech coder/decoder in a digital radio telephone system. The telephone apparatus may be of a digital type. In addition, the telephone apparatus may be portable or mobile. The following description is directed to the case where the echo suppressor is applied to the portable or mobile radio telephone apparatus.

The echo suppressor comprises a reception speech signal detector 13, a time constant circuit 14, a transmission speech signal detector 19, and a variable attenuator 16. The reception speech signal detector 13 is connected to the input terminal 11 and is for detecting the reception speech signal to produce a reception average level signal representative of an average of the reception signal level. In other words, the reception speech signal detector 13 detects a power level of the reception speech signal. The time constant circuit 14 is connected to the reception speech signal detector 13 and is for delaying the reception average level signal by a predetermined delay time to produce a delayed level signal which is supplied as a first level signal to the variable attenuator 16. The time constant circuit 14 will be referred to as a delay arrangement. A combination of the reception speech signal detector 13 and the time constant circuit 14 is referred to as a first detecting arrangement.

The transmission speech detector 19 is connected to the microphone 15 and is for detecting the transmission speech signal to produce a transmission average level signal representative of an average of the transmission signal level. In other words, the transmission speech detector 19 detects a power level of the transmission speech signal to produce, as the transmission average level signal, a second level signal representative of the transmission signal level. The transmission speech detector 19 is referred to as a second detecting arrangement.

The variable attenuator 16 is connected to the microphone 15, the time constant circuit 14, and the transmission speech detector 19 and is for attenuating the transmission signal level with reference to the first and the second level signals in the manner which will presently be described.

Supplied with the transmission speech signal, the variable attenuator 16 attenuates the transmission speech signal at an attenuation factor controlled by the delayed level signal and the transmission average level signal. Specifically, the variable attenuator 16 selects the attenuation factor equal to zero when the average of the transmission signal level is greater than a reference level of, for example, the average of the reception signal level. On the other hand, the attenuation factor is selected to be 1/N (N being a positive real number arbitrarily given) when the average of the transmission signal level is not greater than the average of the reception signal level.

The predetermined delay time is substantially equal to a time duration required for a transmission of the reception speech sound between the receiver 12 and the microphone 15 through the acoustic signal echo path 18. The time duration may be called a propagation delay time.

The description will be directed to an operation of the echo suppressor.

The input terminal 11 is supplied with the reception speech signal, namely, a speech signal of a land-unit speaker. Such a speech signal is transmitted from a radio section of the portable digital radio telephone apparatus (not shown).

The reception speech signal is converted by the receiver 12 into the reception speech sound. The transmission speech sound of a mobile-unit speaker is converted by the microphone 15 into an electric signal, namely, the transmission speech signal. The electric signal is attenuated by the variable attenuator 16 to be delivered through an output terminal 17 to the radio section of the portable digital radio telephone apparatus.

It is assumed that the reception speech sound propagates to the microphone 15 through the acoustic signal echo path 18 of, for example, a casing vibration propagation path and a spatial propagation path to produce an electric echo signal representative of the echo.

The reception speech detector 13 calculates the power level of the reception speech signal to produce the reception average level signal. The time constant circuit 14 delays the reception average level signal by the predetermined delay time and supplies the delayed level signal to the variable attenuator 16 as a control signal therefor. The predetermined delay time is adjusted to be equal to the propagation delay time produced in the acoustic signal echo path 18.

Figure 2:
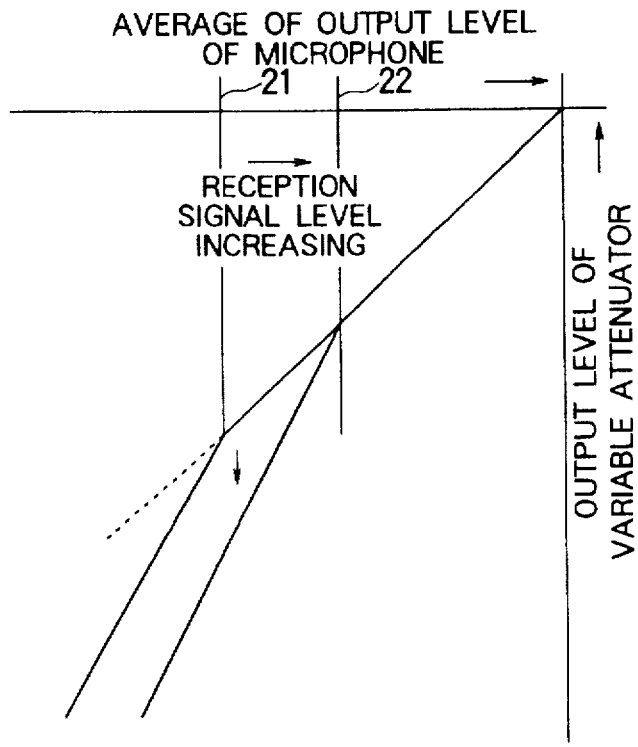
FIG. 2 is a view for describing an operation of a variable attenuator used in the echo suppressor illustrated in FIG. 1.

Turning to FIG. 2, the description is made as regards a characteristic of the variable attenuator 16. In the manner which will be presently described, the variable attenuator 16 makes a reference level be varied in response to the first level signal with the attenuation factor being constant. More particularly, the variable attenuator 16 continuously varies the reference level between first and second predetermined levels 21 and 22 with reference to the first level signal. When the transmission signal level is greater than the selected level, the variable attenuator 16 does not attenuate the transmission signal level. When the transmission signal level is not greater than the selected level, the variable attenuator 16 attenuates the transmission signal level in accordance with the attenuation factor.

The variable attenuator 16 may be designed to select, as the reference level, one of the first and the second predetermined levels 21 and 22 with reference to the first level signal. On determining the first and the second predetermined levels, the variable attenuator 16 will be referred to as a level determining arrangement. On selecting the reference level, the variable attenuator 16 will be referred to as a level selecting arrangement.

Each of the first and the second predetermined levels 21 and 22 may be determined by the attenuation factor of the variable attenuator 16 at a low input level and a desired echo suppressing level. For example, it is assumed that the attenuation factor of the variable attenuator 16 at a low input level is equal to ½ and that the desired echo suppressing level is equal to 3 dB. In this event, the second predetermined level 22 has a value higher by 3 dB than the input level. The first predetermined level 21 serves to remove the noise from a weak signal even in case of speech transmission alone. The above-mentioned variable attenuator 16 may be implemented by a so-called compressor. It is noted here that the power level of the input signal is calculated, for example, by leak integration so as to avoid distortion of an output signal as a result of drastic variation of the gain.

Figure 3:
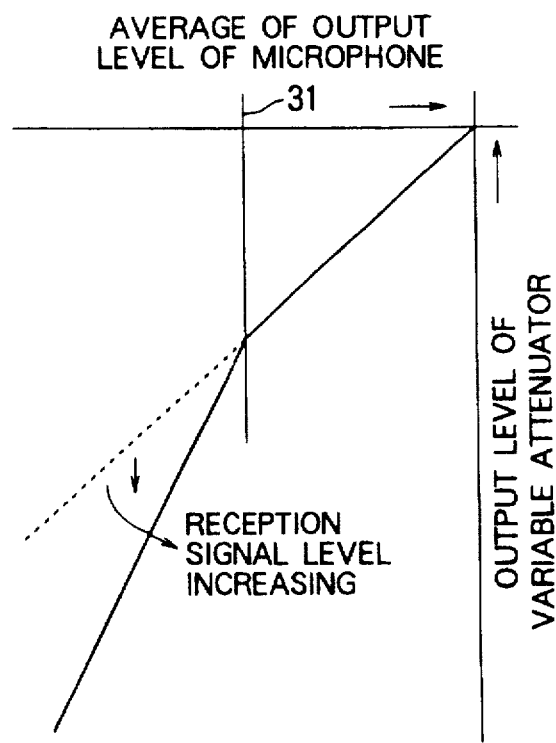
FIG. 3 is a view for describing an operation of a different variable attenuator used in the echo suppressor illustrated in FIG. 1.

Referring to FIG. 3, the variable attenuator 16 illustrated in FIG. 1 may have a different characteristic. Specifically, the attenuation factor is selected to be equal to zero when the average of the transmission signal level is greater than a predetermined level or the reference level 31. When the average of the transmission signal level is not greater than the reference level 31, the variable attenuator 16 attenuates the transmission signal level in accordance with the attenuation factor. In this event, the variable attenuator 16 makes the attenuation factor be varied in response to the first level signal with the reference level being constant. More particularly, the variable attenuator 16 continuously varies the attenuation factor with reference to the first level signal. When the transmission signal level is greater than the reference level 31, the variable attenuator 16 does not attenuate the transmission signal level. When the transmission signal level is not greater than the reference level 31, the variable attenuator 16 attenuates the transmission signal level in accordance with the attenuation factor. The attenuation factor is varied in proportion to a delayed reception speech signal level, namely, the average of the transmission signal level.

The variable attenuator 16 may be designed to select, as the attenuation factor, one of the first and the second factors with reference to the first level signal. On determining the first and the second factors, the variable attenuator 16 will be referred to as a factor determining arrangement. On selecting the attenuation factor, the variable attenuator 16 will be referred to as a factor selecting arrangement.

Thus, in the echo suppressor, no influence is given to the conversation and the natural sound is kept as far as the transmission speech signal is supplied and the average transmission speech signal level is increased. At this time, the echo is not suppressed. However, the echo is relatively weak as compared with the transmission speech signal and therefore does not interfere with the conversation. Thus, the natural sound Is given priority over suppression of the echo.

In addition, suppression is stronger when the average transmission speech signal level is lower. Thus, the weak signal such as the echo signal is greatly suppressed.

As described above, the echo suppressor is achieved which is very effective in case where the coupling between transmitter and receiver sections is relatively weak and where the natural sound of conversation and the economy are regarded important.

While the present invention has far been described in connection with a few embodiments thereof, it will readily be possible for those skilled in the art to put this invention into practice in various other manners. For example, the variable attenuator may be designed to make both of the reference level and the attenuation factor be varied in response to the first level signal.

What is claimed is:

1. An echo suppressor which is for use in combination with a telephone apparatus comprising an input terminal supplied with a reception speech signal, electroacoustic converting means for converting said reception speech signal into a reception speech sound, and acoustoelectric converting means responsive to a transmission speech sound for producing a transmission speech signal, and which is for suppressing an echo resulting from acoustic coupling between said electroacoustic converting means and said acoustoelectric converting means, said reception speech signal having a reception signal level, said transmission speech signal having a transmission signal level, said echo suppressor comprising:

first detecting means connected to said input terminal for detecting said reception speech signal to produce a first level signal representative of said reception signal level;

second detecting means connected to said acoustoelectric converting means for detecting said transmission speech signal to produce a second level signal representative of said transmission signal level; and attenuating means connected to said acoustoelectric converting means and to said first and said second detecting means for attenuating said transmission signal level with reference to said first and said second level signals;

wherein said attenuating means has an attenuation factor and attenuates said transmission signal level in accordance with said attenuation factor only when said transmission signal level is not greater than a reference level which is determined in relation to said reception signal level 2. An echo suppressor as claimed in claim 1, wherein said first detecting means comprises:

speech signal detecting means connected to said input terminal for detecting said reception speech signal to produce a reception average level signal relating to said reception signal level; and delay means connected to said speech signal detecting and said attenuating means for delaying said reception average level signal by a predetermined delay time to produce a delayed level signal which is supplied as said first level signal to said attenuating means.

3. An echo suppressor as claimed in claim 2, wherein said predetermined delay time is substantially equal to a time duration which is required for a transmission of said reception speech sound between said electroacoustic converting and said acoustoelectric converting means.

4. An echo suppressor as claimed in claim 1, wherein said attenuating means makes said reference level be varied in response to said first level signal with said attenuation factor being constant.

5. An echo suppressor as claimed in claim 1, wherein said attenuating means comprises:

level determining means for determining a first and a second predetermined level;

level selecting means connected to said level determining means and said first detecting means for selecting, as a selected level, one of said first and said second predetermined levels with reference to said first level signal; and means connected to said level selecting, said acoustoelectric converting, and said second detecting means for attenuating said transmission signal level in accordance with said attenuation factor only when said transmission signal level is not greater than said selected level.

6. An echo suppressor as claimed in claim 1, wherein said attenuating means makes said attenuation factor be varied in response to said first level signal with said reference level being constant.

7. An echo suppressor as claimed in claim 1, wherein said attenuating means comprises:

factor determining means for determining a first and a second factor;

factor selecting means connected to said factor determining means and said first detecting means for selecting, as a selected factor, one of said first and said second factors with reference to said reception signal level; and means connected to said factor selecting, said acoustoelectric converting, and said second detecting means for attenuating said transmission signal level in accordance with said attenuation factor only when said transmission signal level is not greater than said reference level.

8. A method of suppressing an echo in a telephone apparatus comprising an input terminal supplied with a reception speech signal, electroacoustic converting means for converting said reception speech signal into a reception speech sound, and acoustoelectric converting means responsive to a transmission speech sound for producing a transmission speech signal, said echo resulting from acoustic coupling between said electroacoustic converting means and said acoustoelectric converting means, said reception speech signal having a reception signal level, said transmission speech signal having a transmission signal level, said method comprising the steps of:

detecting said reception speech signal to produce a first level signal representative of said reception signal level;

detecting said transmission speech signal to produce a second level signal representative of said transmission signal level; and attenuating said transmission signal level with reference to said first and said second level signals;

wherein the attenuating step attenuates said transmission signal level in accordance with an attenuation factor only when said transmission signal level is not greater than a reference level which is determined in relation to said reception signal level.

9. A method as claimed in claim 8, wherein the first-mentioned detecting step comprises the steps of:

detecting said reception speech signal to produce a reception average level signal relating to said reception signal level; and delaying said reception average level signal by a predetermined delay time to produce a delayed level signal which is supplied as said first level signal to said attenuating means.

10. A method as claimed in claim 9, wherein said predetermined delay time is substantially equal to a time duration which is required for a transmission of said reception speech sound between said electroacoustic converting and said acoustoelectric converting means.

11. A method as claimed in claim 8, wherein the attenuating step makes said reference level be variable in response to said reception signal level with said attenuation factor being constant.

12. A method of suppressing an echo in a telephone apparatus comprising an input terminal supplied with a reception speech signal, electroacoustic converting means for converting said reception speech signal into a reception speech sound, and acoustoelectric converting means responsive to a transmission speech sound for producing a transmission speech signal, said echo resulting from acoustic coupling between said electroacoustic converting means and said acoustoelectric converting means, said reception speech signal having a reception signal level, said transmission speech signal having a transmission signal level, said method comprising the steps of:

detecting said reception speech signal to produce a first level signal representative of said reception signal level;

detecting said transmission speech signal to produce a second level signal representative of said transmission signal level; and attenuating said transmission signal level with reference to said first and said second level signals;

wherein the attenuating step comprises the steps of:

determining a first and a second predetermined level;

selecting, as a selected level, one of said first and said second predetermined levels with reference to said first level signal; and attenuating said transmission signal level in accordance with said attenuation factor only when said transmission signal level is not greater than said selected level.

13. A method as claimed in claim 12, wherein the attenuating step makes said attenuation factor be variable in response to said reception signal level with said reference level being constant.

14. A method of suppressing an echo in a telephone apparatus comprising an input terminal supplied with a reception speech signal, electroacoustic converting means for converting said reception speech signal into a reception speech sound, and acoustoelectric converting means responsive to a transmission speech sound for producing a transmission speech signal, said echo resulting from acoustic coupling between said electroacoustic converting means and said acoustoelectric converting means, said reception speech signal having a reception signal level, said transmission speech signal having a transmission signal level, said method comprising the steps of:

detecting said reception speech signal to produce a first level signal representative of said reception signal level;

detecting said transmission speech signal to produce a second level signal representative of said transmission signal level; and attenuating said transmission signal level with reference to said first and said second level signals;

wherein the attenuating step comprises the steps of:

determining a first and a second attenuation factor;

selecting, as a selected factor, one of said first and said second attenuation factors with reference to said reception signal level; and attenuating said transmission signal level in accordance with said selected attenuation factor only when said transmission signal level is not greater than said reference level.

15. A telephone apparatus comprising:

an input terminal supplied with a reception speech signal having a reception signal level;

electroacoustic converting means connected to said input terminal for converting said reception speech signal into a reception speech sound;

acoustoelectric converting means responsive to a transmission speech sound for producing a transmission speech signal having a transmission signal level; and an echo suppressor connected to said input terminal and said acoustoelectric converting means for suppressing an echo resulting from acoustic coupling between said electroacoustic converting means and said acoustoelectric converting means, said echo suppressor comprising:

first detecting means connected to said input terminal for detecting said reception speech signal to produce a first level signal representative of said reception signal level;

second detecting means connected to said acoustoelectric converting means for detecting said transmission speech signal to produce a second level signal representative of said transmission signal level; and attenuating means, connected to said acoustoelectric converting means and to said first and second detecting means, for attenuating said transmission signal level with reference to said first and said second level signals;

wherein said attenuating means has an attenuation factor and attenuates said transmission signal level in accordance with said attenuation factor only when said transmission signal level is not greater than a reference level which is determined in relation to said reception signal level.

\* \* \* \* \*